US009059963B2

(12) United States Patent
Carroll

(10) Patent No.: US 9,059,963 B2
(45) Date of Patent: Jun. 16, 2015

(54) METHOD AND SYSTEM FOR STORAGE AND SELECTIVE SHARING OF VEHICLE DATA

(71) Applicant: MyClassicGarage, LLC, Charlotte, NC (US)

(72) Inventor: Joseph M. Carroll, Charlotte, NC (US)

(73) Assignee: MyClassicGarage, LLC, Charlotte, NC (US)

( * ) Notice: Subject to any disclaimer, the term of this patent is extended or adjusted under 35 U.S.C. 154(b) by 167 days.

(21) Appl. No.: 13/886,820

(22) Filed: May 3, 2013

(65) Prior Publication Data

US 2013/0332578 A1 Dec. 12, 2013

Related U.S. Application Data

(60) Provisional application No. 61/657,172, filed on Jun. 8, 2012.

(51) Int. Cl.
*H04L 29/08* (2006.01)
*G06F 17/22* (2006.01)
*G06Q 30/02* (2012.01)
*G06Q 50/00* (2012.01)
*G06F 21/62* (2013.01)

(52) U.S. Cl.
CPC ............ *H04L 67/02* (2013.01); *G06F 17/2247* (2013.01); *G06Q 30/02* (2013.01); *G06Q 50/01* (2013.01); *G06F 21/6218* (2013.01); *G06F 2221/2137* (2013.01)

(58) Field of Classification Search
CPC ........ G06Q 30/02; G06Q 50/01; H04L 67/02; G06F 21/6218; G06F 17/2247; G06F 2221/2137

USPC .................................................. 709/219, 217
See application file for complete search history.

(56) References Cited

U.S. PATENT DOCUMENTS

| 6,714,894 B1* | 3/2004 | Tobey et al. ................... 702/188 |
| 7,406,436 B1* | 7/2008 | Reisman ...................... 705/7.32 |
| 7,478,157 B2* | 1/2009 | Bohrer et al. ................. 709/226 |
| 2002/0180582 A1* | 12/2002 | Nielsen .......................... 340/5.6 |
| 2003/0071730 A1* | 4/2003 | Valbh ......................... 340/572.1 |
| 2003/0130774 A1 | 7/2003 | Tripathi et al. |
| 2004/0160304 A1* | 8/2004 | Mosgrove et al. ........... 340/5.21 |
| 2005/0021200 A1* | 1/2005 | Taki ................................ 701/33 |

(Continued)

FOREIGN PATENT DOCUMENTS

| CN | 102118368 A * | 7/2011 | ............. H04L 29/06 |
| DE | 102006028098 A1 * | 12/2006 | ............... G07C 9/00 |

(Continued)

OTHER PUBLICATIONS

European Search Report in counterpart European Patent Application No. 13170939, dated Aug. 14, 2013.

*Primary Examiner* — Kostas Katsikis
(74) *Attorney, Agent, or Firm* — Additon, Higgins & Pendleton, P.A.

(57) ABSTRACT

The method and system allow an owner of a collection of vehicles, such as a classic automobile collection, to upload and store public and private vehicle information. Public vehicle information is accessible by other users of the system desiring to learn about the user's vehicle collection. Private vehicle information is available only to those users whom the vehicle owner designates should receive an evaluation file containing the private information.

6 Claims, 5 Drawing Sheets

(56) References Cited

U.S. PATENT DOCUMENTS

| | | | |
|---|---|---|---|
| 2005/0256616 A1* | 11/2005 | Rhoads | 701/1 |
| 2006/0143097 A1* | 6/2006 | Mitterreiter et al. | 705/28 |
| 2007/0222555 A1* | 9/2007 | Tengler et al. | 340/5.6 |
| 2008/0201163 A1* | 8/2008 | Barker et al. | 705/1 |
| 2008/0291889 A1* | 11/2008 | Matsumoto | 370/348 |
| 2009/0015373 A1* | 1/2009 | Kelly et al. | 340/5.62 |
| 2009/0254971 A1* | 10/2009 | Herz et al. | 726/1 |
| 2010/0211770 A1* | 8/2010 | Alrabady et al. | 713/150 |
| 2011/0112717 A1 | 5/2011 | Resner | |
| 2012/0143402 A1* | 6/2012 | Kim et al. | 701/2 |
| 2013/0031604 A1* | 1/2013 | Esselink et al. | 726/3 |
| 2013/0317666 A1* | 11/2013 | Sekiyama | 701/1 |
| 2014/0040434 A1* | 2/2014 | Rybak et al. | 709/219 |

FOREIGN PATENT DOCUMENTS

| | | | | |
|---|---|---|---|---|
| EP | 1862986 A1 | * | 12/2007 | G08G 1/14 |
| WO | WO 2012134571 A1 | * | 10/2012 | H04W 12/06 |
| WO | WO 2013100922 A1 | * | 7/2013 | H04L 9/32 |

\* cited by examiner

METHOD AND SYSTEM FOR STORAGE AND SELECTIVE SHARING OF VEHICLE DATA

FIELD OF THE INVENTION

The disclosure relates generally to information systems, and, more specifically, to a method and system adapted to enable vehicle owners to store vehicle data and selectively share vehicle data with designated prospective buyers.

BACKGROUND OF THE INVENTION

Developments in information technology in the last twenty years have greatly enhanced the way in which markets for certain goods operate. In particular, the market for new and used vehicles has been helped by the introduction of numerous websites that allow users to view a tremendous number of available vehicles without having to travel to the owner's location. These websites provide users with real-time information regarding vehicles on the market, as well as the ability to make instant offers for the purchase of a vehicle. Improvements in network speeds over the years has enabled users to upload to these websites greater amounts of multimedia information, such as photographs, relating to vehicles they are selling. In addition, these websites provide continually-updated information regarding market trends.

Although these websites are often tremendously useful to buyers and sellers of many types of vehicles, they typically do not cater to the specific needs of the classic automobile collector. While classic automobile collectors buy and sell autos like any other person in the market, they also tend to have a greater interest in examining the inventory of other classic automobile owners. Many people are attracted to owning a classic automobile not only because of the nostalgia involved with owning a rare vehicle, but also because of the sense of community and camaraderie enjoyed among classic automobile owners. These owners tend to swap stories, share advice, and compare collections whenever they interact. Most online sites are more focused on the buying and selling aspect to the car market, as opposed to this community aspect.

In addition, most traditional online automobile market sites tend to fail to account for a very important factor in the classic automobile market. The vehicle history of a classic automobile is often paramount in determining the value of the particular classic automobile. By virtue of their age, most all classic automobiles have undergone some degree of repair and/or restoration. The degree and manner of restoration can dramatically impact the value of the particular classic automobile. For example, a restoration using all original equipment manufacturer parts would tend to result in a much higher resale value for a classic automobile than a restoration using replicated parts. Classic automobile owners who maintain proper documentation regarding the restoration and ownership history of their classic automobiles greatly enhance the value of their collection. Furthermore, prospective buyers of classic automobiles are keenly interested in reviewing such documentation to determine its validity and to assess the valuation of the automobile based on its history as reflected in the documentation. Because of the greatly heightened importance of the documentation of vehicle history in the classic automobile market, classic automobile owners are highly protective of their documentation and are sometimes reluctant to show some or all of their documents to anyone other than a prospective buyer showing genuine interest in purchasing the classic automobile.

Accordingly, there exists a need for a system of organizing and sharing information relating to an owner's classic automobile collection, and for ensuring that the owner has control over who gains access to information about certain vehicles in the owner's classic automobile collection.

SUMMARY OF THE INVENTION

The disclosure embraces a computerized method and computer-based system for storing and exchanging information relating to classic automobiles. In one aspect, the disclosure embraces a computer-implemented method for selectively sharing vehicle data comprising providing at least one server in communication with a computer network; providing a database accessible by the at least one server for storing vehicle data, the vehicle data comprising public vehicle information and private vehicle information; providing to the at least one server, via the computer network, a user's request to view private vehicle information associated with an owner's vehicle; processing with the at least one server whether said user has viewing privileges that have not expired entitling the user to view the private vehicle information associated with the owner's vehicle; if the user has viewing privileges that have not expired entitling the user to view the private vehicle information associated with the owner's vehicle, transmitting the private vehicle information associated with the owner's vehicle from the at least one server via the computer network for viewing by the user on a remote computer device in communication with the computer network.

In another aspect, the disclosure embraces a computer-based system for selectively sharing vehicle data comprising at least one server in communication with a computer network; at least one database for storing vehicle data, the database being accessible by the at least one server; wherein the vehicle data comprises public vehicle data and private vehicle data; wherein the at least one server, upon receiving via the computer network a user's request to view private vehicle information associated with an owner's vehicle, processes whether said the has viewing privileges that have not expired entitling the user to view the private vehicle information; and wherein the at least one server is configured to transmit, if the user has viewing privileges that have not expired, the private vehicle information from the at least one server via the computer network for viewing by the user on a remote computer device in communication with the computer network.

In another aspect, the disclosure embraces a computer-implemented method for selectively sharing vehicle data comprising providing a website hosted by at least one server in communication with a computer network; providing at least one database for storing vehicle data; wherein said at least one server is configured to access the vehicle data stored in said at least one database; and wherein said website is adapted for enabling generation of a graphical user interface in a web browser at a plurality of locations over a communications network, the graphical user interface comprising a first interface that allows an owner upload vehicle data to said database; a second interface that allows an owner to designate certain vehicle data as private vehicle information and certain vehicle data as public vehicle information, and that further allows said owner to grant viewing privileges to a user, said viewing privileges allowing said user to view said private vehicle information; and a third interface that allows a user having unexpired viewing privileges to view said private vehicle data associated with said owner's vehicle.

In another aspect, the disclosure embraces a web-based software application allowing user to upload information relating to the users classic automobile collection and to download information relating to the classic automobile collections of others.

DETAILED DESCRIPTION

Figure 1:
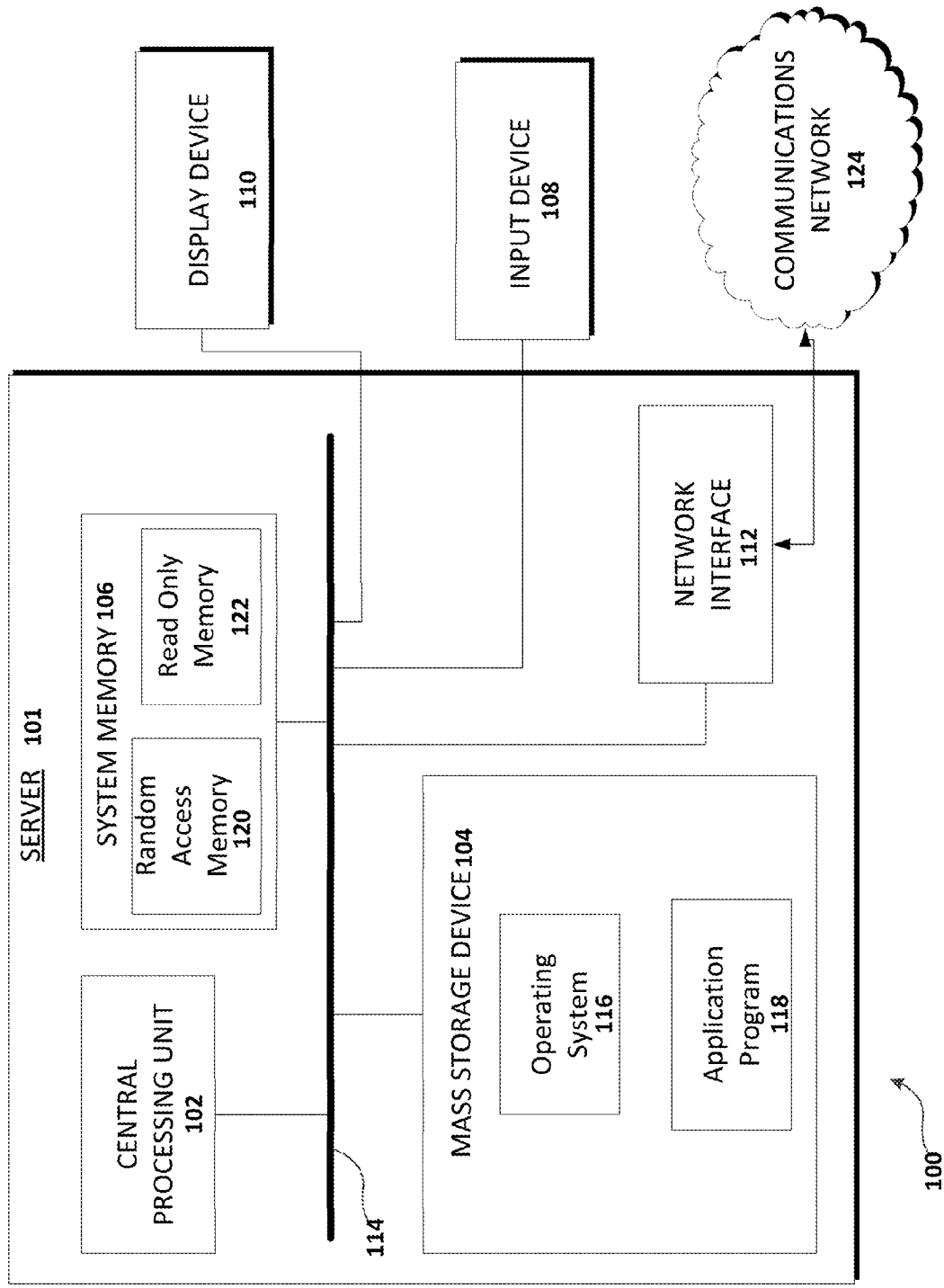
FIG. 1 a schematic diagram representing an exemplary computer system according to the present invention.

The exemplary systems and methods described herein are implemented using a computer (e.g., a computer hardware system). The computer may function as a server (e.g., a host), a client (e.g., remote computer) or both. Typically, a computer operating as a server is designed and dedicated to process requests and deliver data to client computers distributed over a computer network (e.g., local area network or Internet). Although servers typically are configured in a manner to provide greater processing power and memory and storage capacity than a client computer, servers and clients typically share fundamental aspects of computer architecture. FIG. 1 is a schematic representation of an exemplary computer system for use in an exemplary system and method according to the present invention. The computer system is comprised of a server 101 having a central processing unit 102, a mass storage device 104 for storing an operating system 116, application programs 118, and other types of information, a system memory 106, an input device 108 for receiving input from a user, a display device 110, and a network interface 112 for communicating with a communications network. The central processing unit 102, system memory 106, mass storage device 104, input device 108, display device 110, and network interface 112 are all operably connected to a system bus 114. The operating system 116 is software that controls the overall operation of the server 101, including process scheduling and management, process protection, and memory management. Typically, the operating system 116 is loaded by booting the server 101 and is executed directly by the central processing unit 102. An application program 118 is an executable software program designed to help the computer system user perform specific tasks. The application programs 118 may load automatically upon execution of the operating system 116 or in response to a command input from the computer system user. A system memory 106 provides for storage of instructions and data directly accessible by the central processing unit 102. System memory 106 may include random-access memory (RAN) 120 and read-only memory (ROM) 122. The ROM 122 may permanently store a basic input/output system (BIOS), which provides the first instructions to the server when it boots up. The RAM 120 typically serves as temporary and immediately accessible storage for the operating system 116 and application programs 118. The mass storage device 104 may be any of the various types of components capable of storing large amounts of data in a persisting (i.e., non-volatile) and machine-readable manner. Typically, the mass storage device 104 will be a hard disk drive.

Figure 2:
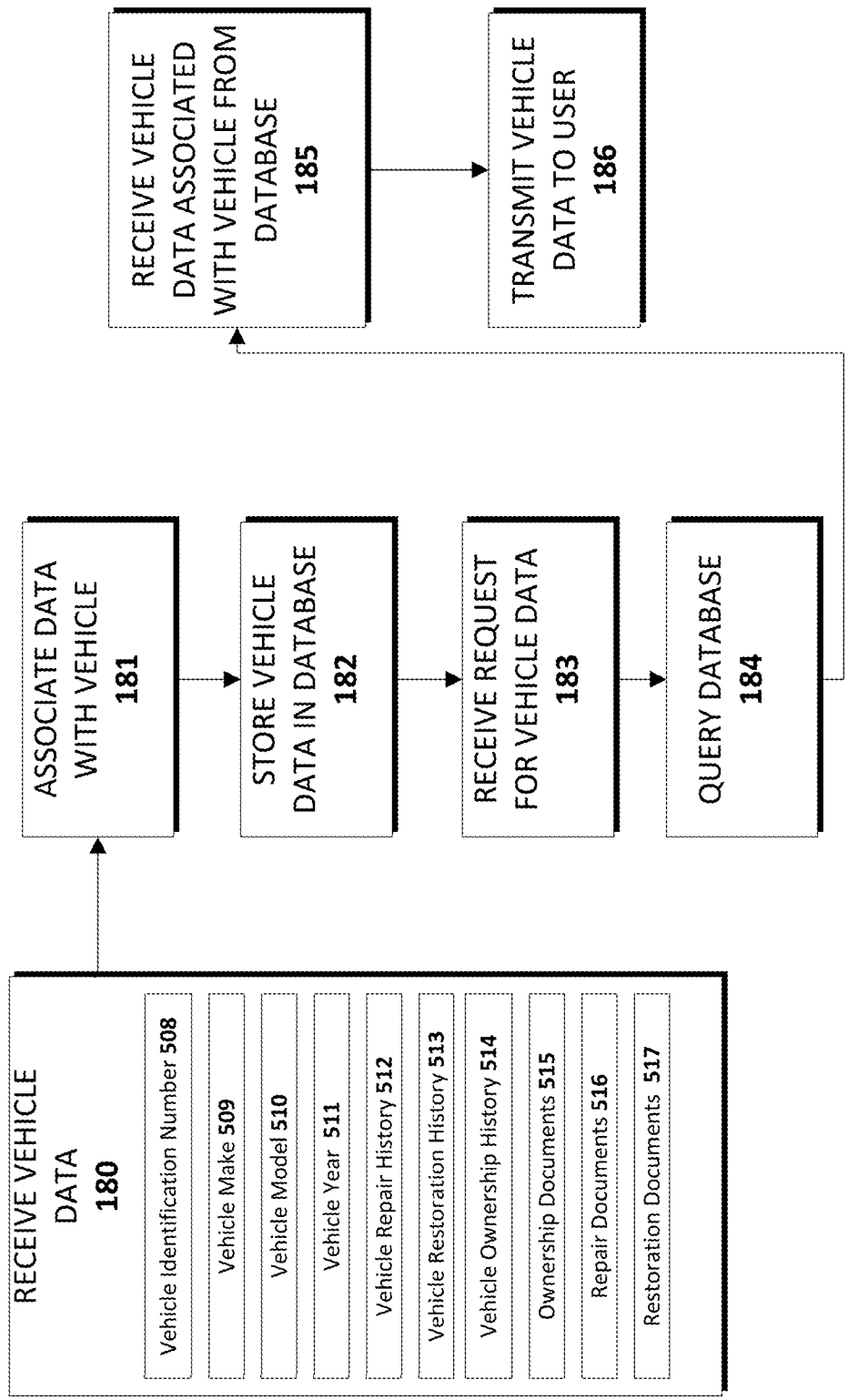
FIG. 2 is a block diagram representing an exemplary method of storing and retrieving vehicle data according to the present invention. creation of a new user account and the main menu selections of a method and system according to the present invention.

FIG. 2 is a flow chart depicting an aspect of the computer-implemented method according to the present invention. A database receives vehicle data 180. Vehicle data includes vehicle identification number 508, vehicle make 509, vehicle model 510, vehicle year 511, vehicle repair history 512, vehicle restoration history 513, vehicle ownership history 514, ownership documents 515, repair documents 516, and restoration documents 517. The documents are typically received as image files (e.g., scanned document files). Each item of vehicle data is associated with a particular vehicle (e.g., one of the vehicles in an owner's virtual garage). Typically, the vehicle data is obtained by owner input on a client computer, and the vehicle data is transmitted via the communications network to the server for storage in the database 182. The input may include text or multimedia such as digital photographs, digital video or scanned documents. Typically, the owner creates the association between each item of vehicle data and a particular vehicle as the owner is inputting the vehicle data, and the association information is transmitted to the server for storage in the database. In this way, and using the functional features of the database, all of the vehicle data associated with a particular vehicle may be accessed by the server upon initiation of an appropriate query to the database. When the system receives a user's request to view the vehicle data associated with a particular vehicle 183, the system initiates an appropriate query to the database 184. The server receives the requested vehicle data from the database 185. The server then transmits the vehicle data to the user who requested the information 186.

As used herein, an owner is a user who is associated with a particular vehicle having vehicle data stored in the database. The term owner as used herein is not intended to be limited to users who are titled owners of a particular vehicle, but is intended in a broad sense to also include users acting on behalf of a titled owner (e.g., broker, dealer, or titled owner's representative).

An owner may designate one or more items of vehicle data as private vehicle information. Private vehicle information may only be viewed by users who have been granted viewing privileges. Any vehicle data that is not private vehicle information is public vehicle information. Public vehicle information may be viewed by any user. Typically, viewing privileges are granted by the owner in response to a user's request to view the information. For example, a user may be interested in potentially buying an owner's vehicle, and would like to inform his buying decision by reviewing certain private vehicle information such as the vehicle repair history. The user may initiate a request to view the private vehicle information. In response to the request, an owner may, at his option, send via the communications network instructions to the server to grant viewing privileges to the requesting user allowing the user to view the indicated private vehicle information. The viewing privileges may permit the viewing of all or only some of the owner's private information. For example, an owner may specify that a user can view private vehicle information relating to vehicle restoration history 513, but cannot view private vehicle information relating to vehicle repair history 512. Alternatively, an owner may grant to a user viewing privileges without receiving a request from the user. For example, an owner may specify that a particular class of users (e.g., friends, trusted buyers) be granted viewing privileges automatically upon request to view private vehicle information. When the server 101 receives a request from a user to view private information, it will process the request to determine whether the user has valid viewing privileges relating to the requested private information. If the user has viewing privileges, the server 101 will retrieve the requested private vehicle information from the database and will transmit it via the communications network 124 for display on the user's computer.

In one embodiment, the server 101 may receive instructions from the owner indicating that the viewing privileges expire after a predetermined time period (e.g., between twenty-four and thirty-six hours) beginning when the server 101 transmits to the user via the communications network 124 the private vehicle information. For example, the server 101 may receive instructions that a user is granted viewing privileges, but that the viewing privileges expire in forty-eight hours. The server 101 will provide a user access to private vehicle information for which the user has viewing privileges so long as the viewing privileges are not expired. Once expired, the viewing privileges are revoked, thereby preventing further viewing of the private vehicle information by the user. Alternatively, the server 101 may receive instructions from the owner indicating that the viewing privileges are to expire at a time and date certain. For example, the owner may indicate that the viewing privileges expire at midnight on the last day of the month. This time-limiting aspect of viewing privileges allows the owner greater control over the dissemination of private vehicle information, which greater control can help alleviate concerns (e.g., concerns about fraud, document alteration, defamation) that are particularly prevalent in the classic automobile market.

In an alternative embodiment, the computer system 100 according to the present disclosure comprises a server 101 including a web server subsystem for generating both dynamic and static web pages (e.g., a website) as is known in the art, and for receiving data and/or commands. One or more databases support the functioning of this server subsystem. The web server utilizes various scripting or other executable programs for providing dynamic content to the user's computer, which computer is connected to the web server via a communications network (e.g., the Internet). Typically, the computer software which operates the system is stored on a remote server. The user accesses the system's dynamic and static web pages via a web browser application.

Figure 3:
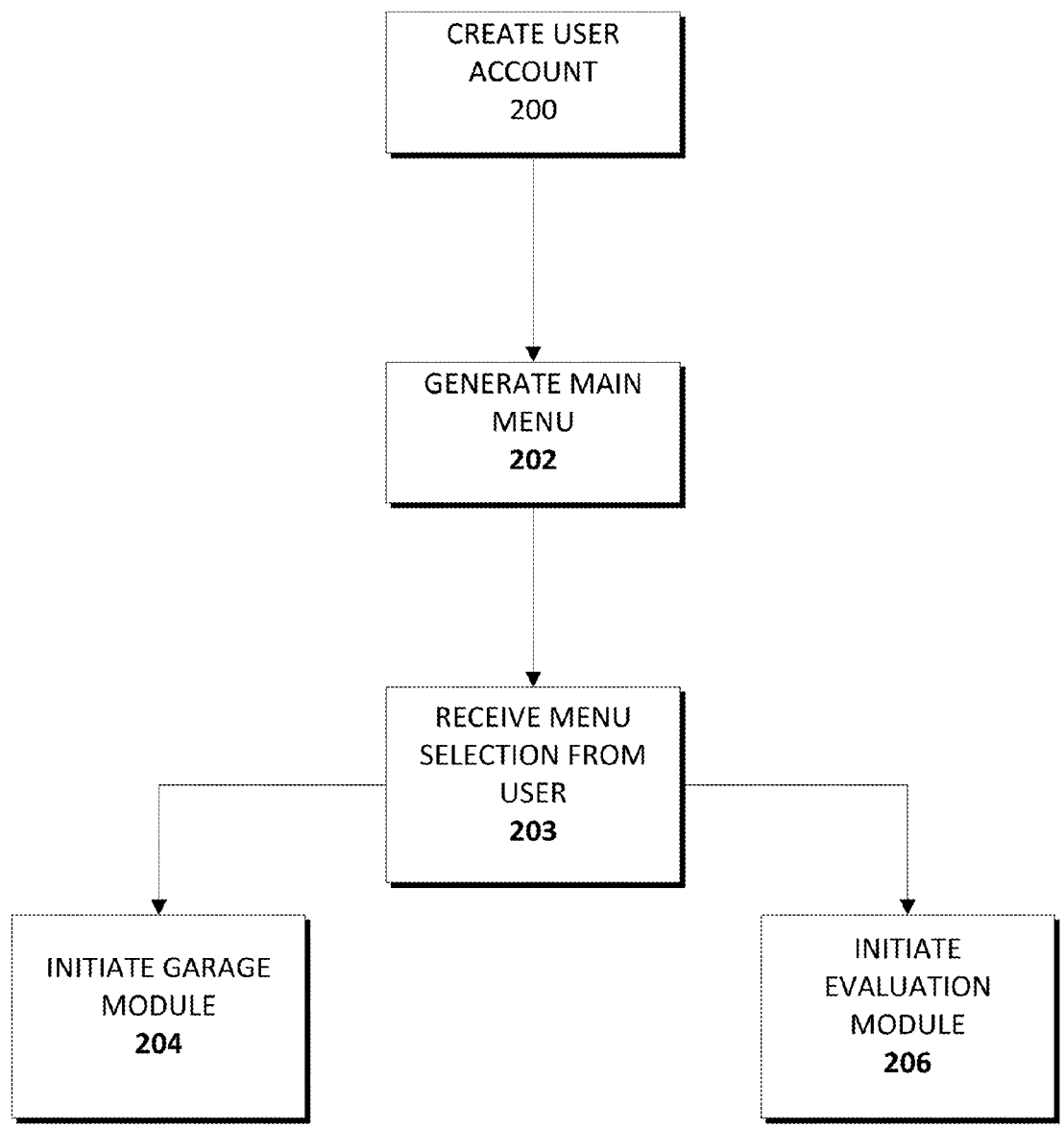
FIG. 3 is a block diagram representing an exemplary method of creating of a new user account and selecting menu options according to the present invention.

The user accesses the system by directing the web browser application on the user's computer to the web address of the system's website. As depicted in FIG. 3, a new user will typically need to create an account prior to accessing the full range of content available through the website 200. Typically, users having an established account will be able to access the complete web content after entering account authentication information (e.g., username and password). Upon verification of the user's authentication credentials, the system generates a main menu 202. The user is allowed to choose among several menu options, which options include initiating the garage module and initiating the evaluations module 203. If the user selects the garage module option, the garage module is executed 204. If the user selects the evaluation module option, the evaluation module is executed 206.

The garage module allows the owner to store and view information relating to his vehicle collection. The garage module represents a "virtual garage" where owners list the individual vehicles in their vehicle collection. The main webpage of the garage module lists the vehicles in the owner's vehicle collection and allows for the owner to add vehicles to the list. To add a vehicle, the owner selects the appropriate input. The owner is then presented with a webpage that prompts the owner to enter identifying information about the vehicle (e.g., vehicle data) that the owner wishes to add to the owner's virtual garage.

Figure 4:
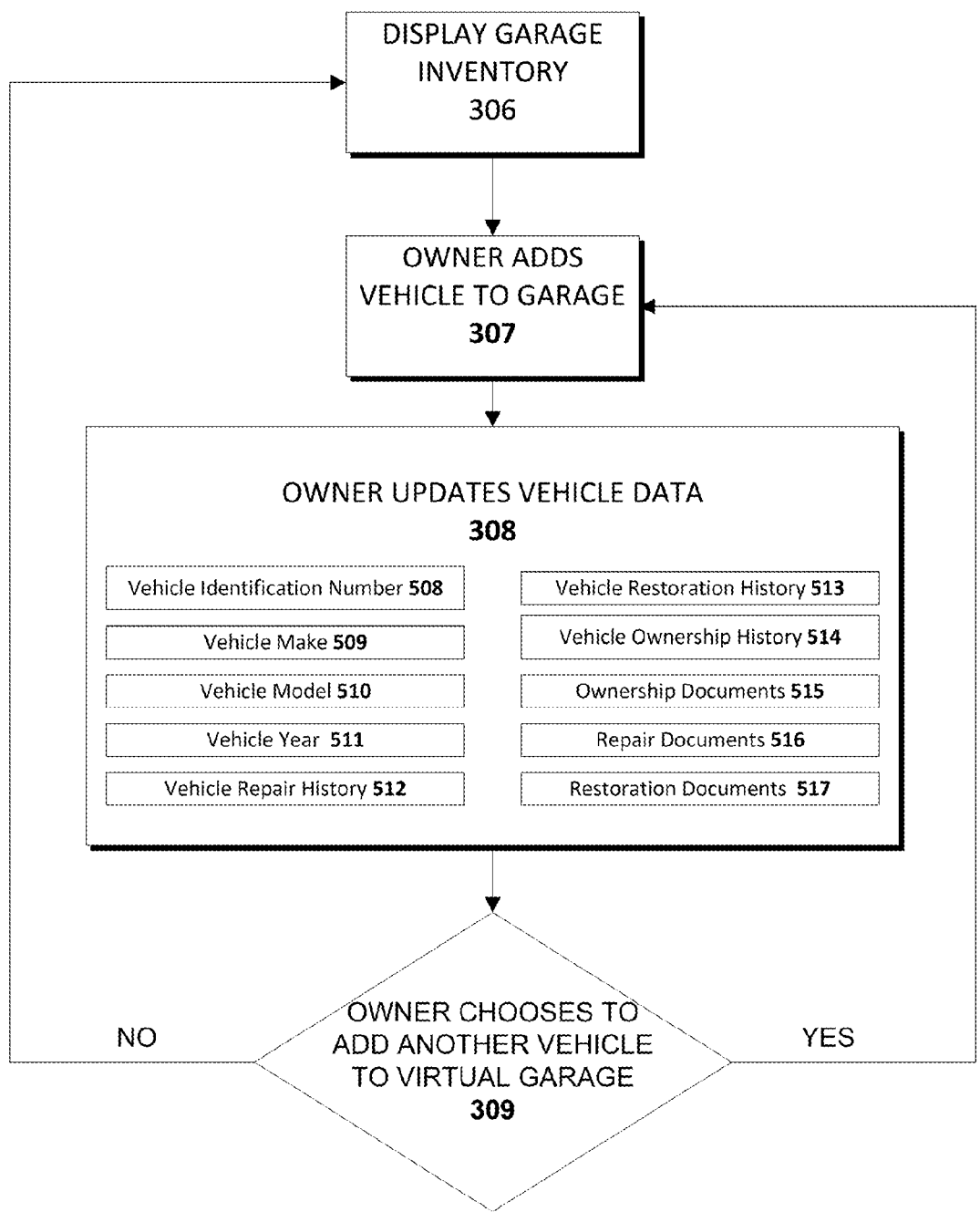
FIG. 4 is a block diagram representing an exemplary garage module according to the present invention.

FIG. 4 is a block diagram depicting the steps used in an exemplary garage module of the method and system according to the present invention. In a preferred embodiment, the owner is first presented with a listing of all the vehicles in the virtual garage inventory 306. The owner is prompted to update the virtual garage with any new vehicles 307. Upon selecting the appropriate input to add a vehicle to the garage (e.g., by clicking on the appropriate onscreen button), owner user is prompted to input the vehicle data 308. After entering or updating as much information as the owner desires, the owner can choose to add another vehicle to the virtual garage 309. If there are no further vehicles to add, the garage module simply displays a listing of the vehicles currently in the virtual garage inventory 306.

Typically, the system allows the owner to customize the visibility of the owner's virtual garage with respect to third parties (e.g., users). That is, the system allows the owner to specify which vehicles in the owner's virtual garage will be visible to other users on the system. In addition, and of particular importance to the classic automobile collector, the system allows the user to specify what vehicle information is accessible by other system users who visit the owner's virtual garage and what information is kept private (i.e., what information is viewable only by the vehicle owner). For example, the owner may upload digital images of certain documents evidencing restoration work done on a vehicle. For various reasons, the owner may not wish for other users, especially those users that have no real interest in purchasing one of the vehicles, to view this type of documentation. The system allows the owner to designate those images as private vehicle information. When another user visits the owner's virtual garage, that user will not be able to access those digital documents.

There will be times, however, when an owner will want to share private information relating to one or more vehicles. For instance, when the owner is approached (either online or otherwise) by a bona fide prospective purchaser (e.g., a user), the owner may wish to allow that user to view the private vehicle information. The system's evaluation module provides for an evaluation file, in which an owner can store all of the information that the owner wishes to share with another system user. The evaluation file may include public vehicle information and private vehicle information. For instance, the owner may direct the system to include information about repair history in the evaluation file. Because of the sensitive nature of some of the private vehicle information that may be included in an evaluation file, the system allows the user to restrict access to the evaluation file for a limited duration. Typically, the system will allow a designated user to view the contents of the evaluation file for between twenty-four and seventy-two hours. Upon the expiration of the evaluation file, the user who received the evaluation file will not be able to view the information contained in an evaluation file.

From the perspective of a prospective buyer, that user may wish to inquire about the status of a particular vehicle in an owner's virtual garage. For example, the user may have searched the system for a particular vehicle and found that vehicle in another owner's virtual garage. The system allows the prospective buyer to visit the other owner's virtual garage. The user may view all of the public vehicle information that the owner has listed regarding each vehicle in the owner's virtual garage. If the prospective buyer wishes to know more about a certain vehicle, the user may submit a request for an evaluation file to the owner through the system. If the owner accepts the request, the system will notify the user that an evaluation file is available for examination. By selecting the evaluation file input, the user will be given access to all the private vehicle information contained in the evaluation file until the evaluation file expires.

Figure 5:
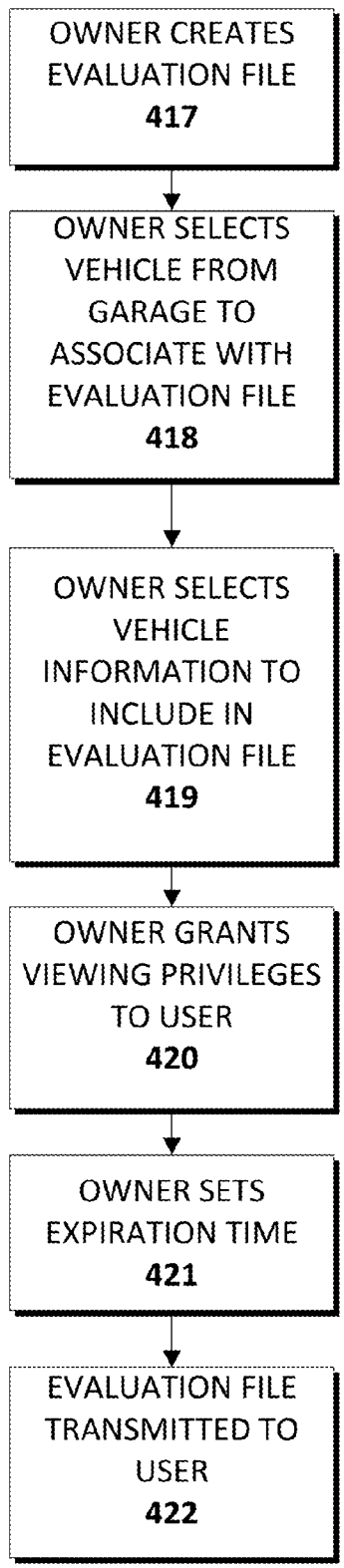
FIG. 5 is a block diagram representing an exemplary evaluation module of an exemplary method and system according to the present invention.

FIG. 5 is a block diagram illustrating the steps used in an exemplary evaluation module of the method and system according to the present invention. In a preferred embodiment, an owner wishing to share information via an evaluation file selects the appropriate menu input for creating a new evaluation file 417. The system then prompts the owner to select the vehicle from the owner's virtual garage which the owner wishes to associate with the evaluation file 418. The owner can then designate which types of public vehicle information and which types of private vehicle information the owner wishes to include in the evaluation file 419. The owner then designate which specific user(s), or categories of users, will have viewing privileges for the evaluation file 420. Typically, the owner selects the recipient by inputting the name of the user's virtual garage. The system also prompts the owner to select the duration of time that the recipient of the evaluation file will have access to the information (e.g., set an expiration time for the evaluation file) 421. The system then transmits the evaluation file to the userF requesting the information via the communications network 422. In this way, the evaluation file acts to "virtually park" the subject vehicle in the prospective buyer's virtual garage, thereby taking the place of traditional vehicle inspections that are often difficult or impossible due to the physical distance between buyer and seller and/or due to problems associated with scheduling a vehicle inspection.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A computer-implemented method for selectively sharing vehicle data comprising:
providing at least one server in communication with a computer network;
providing a database accessible by said at least one server for storing vehicle data, said vehicle data comprising public vehicle information and private vehicle information;
providing to said at least one server, via said computer network, a user's request to view private vehicle information associated with an owner's vehicle;
processing with said at least one server whether said user has viewing privileges that have not expired entitling said user to view said private vehicle information associated with said owner's vehicle;
if said user has viewing privileges that have not expired entitling said user to view said private vehicle information associated with said owner's vehicle, transmitting said private vehicle information associated with said owner's vehicle from said at least one server via said computer network for viewing by said user on a remote computer device in communication with said computer network;
receiving at said at least one server, via said computer network, instructions from said owner indicating whether said user has viewing privileges entitling said user to view said private vehicle information associated with said owner's vehicle; and
receiving at said at least one server, via said computer network, instructions from said owner indicating the time of expiration of said viewing privileges entitling said user to view said private vehicle information associated with said owner's vehicle.

2. The computer-implemented method of claim 1, wherein said viewing privileges automatically expire after a predetermined time period following the transmission of said private vehicle information from said at least one server via said computer network.

3. The computer-implemented method of claim 2, wherein said predetermined time period is between one and three days.

4. The computer-implemented method of claim 2, wherein said vehicle data comprises vehicle make, vehicle model, vehicle year, vehicle repair history, vehicle restoration history, vehicle ownership history, images of ownership documents, images of repair documents, and images of restoration documents.

5. A computer-based system for selectively sharing vehicle data comprising:
a CPU coupled to a memory;
at least one server in communication with a computer network;
at least one database for storing vehicle data, said database being accessible by said at least one server;
wherein said vehicle data comprises public vehicle data and private vehicle data;
wherein said at least one server, upon receiving via said computer network a user's request to view private vehicle information associated with an owner's vehicle, processes whether said user has viewing privileges that have not expired entitling said user to view said private vehicle information; and
wherein said at least one server is configured to transmit, if said user has viewing privileges that have not expired, said private vehicle information from said at least one server via said computer network for viewing by said user on a remote computer device in communication with said computer network; and
wherein the time of expiration of a said user's viewing privileges is determined by the owner of the vehicle.

6. A computer-implemented method for selectively sharing vehicle data, comprising:
providing a website hosted by at least one server in communication with a computer network; and
providing at least one database for storing vehicle data;
wherein said at least one server is configured to access the vehicle data stored in said at least one database; and
wherein said website is adapted for enabling generation of a graphical user interface in a web browser at a plurality of locations over a communications network, the graphical user interface comprising:
a first interface that allows an owner upload vehicle data to said database;
a second interface that allows an owner to (i) designate certain vehicle data as private vehicle information and certain vehicle data as public vehicle information, (ii) grant viewing privileges to a user, said viewing privileges allowing said user to view said private vehicle information; and (iii) set a time of expiration for the user's viewing privileges;
a third interface that allows a user having unexpired viewing privileges to view said private vehicle data associated with said owner's vehicle.

* * * * *